(12) United States Patent
McGuinness

(10) Patent No.: US 7,675,646 B2
(45) Date of Patent: Mar. 9, 2010

(54) FLEXIBLE PRINT DATA COMPRESSION

(75) Inventor: William F. McGuinness, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1294 days.

(21) Appl. No.: 11/140,798

(22) Filed: May 31, 2005

(65) Prior Publication Data

US 2006/0268322 A1 Nov. 30, 2006

(51) Int. Cl.
*G06F 3/12* (2006.01)

(52) U.S. Cl. .................. 358/1.2; 358/1.9; 382/232; 382/244

(58) Field of Classification Search ......... 382/232–253; 358/1.15, 426.13, 426.14
See application file for complete search history.

(56) References Cited

U.S. PATENT DOCUMENTS

| | | | | |
|---|---|---|---|---|
| 5,479,587 A * | 12/1995 | Campbell et al. | ........... | 358/1.17 |
| 5,638,498 A * | 6/1997 | Tyler et al. | ................. | 358/1.18 |
| 5,999,272 A * | 12/1999 | Dow et al. | ................. | 358/1.15 |
| 6,337,747 B1 * | 1/2002 | Rosenthal | .................. | 358/1.15 |
| 6,564,282 B1 * | 5/2003 | Torres | ........................... | 711/1 |
| 6,577,254 B2 * | 6/2003 | Rasmussen | .................. | 341/51 |
| 6,583,887 B1 * | 6/2003 | Clouthier et al. | ........... | 358/1.15 |
| 6,614,544 B2 * | 9/2003 | Tokura | ....................... | 358/1.15 |
| 6,731,814 B2 * | 5/2004 | Zeck et al. | .................... | 382/239 |
| 6,747,762 B1 * | 6/2004 | Josephsen et al. | ........... | 358/453 |
| 7,068,398 B2 * | 6/2006 | Rijavec | ................. | 358/426.01 |
| 7,352,300 B2 * | 4/2008 | Fallon | .......................... | 341/51 |
| 7,358,867 B2 * | 4/2008 | Fallon | .......................... | 341/51 |
| 7,378,992 B2 * | 5/2008 | Fallon | .......................... | 341/51 |
| 7,386,046 B2 * | 6/2008 | Fallon et al. | ................. | 375/240 |
| 2004/0027606 A1 * | 2/2004 | Kao et al. | .................. | 358/1.15 |
| 2004/0096102 A1 | 5/2004 | Handley | | |
| 2004/0114195 A1 | 6/2004 | Ebner et al. | | |
| 2004/0125385 A1 * | 7/2004 | Mellor et al. | ................. | 358/1.1 |
| 2005/0071579 A1 * | 3/2005 | Luick | ......................... | 711/154 |

\* cited by examiner

*Primary Examiner*—Kimberly A Williams
(74) *Attorney, Agent, or Firm*—Gibb I.P. Law Firm, LLC

(57) ABSTRACT

Methods for evaluating whether to compress data sent to a print device receive bands of printing data. Each band of printing data comprises a plurality of lines of printing data. A subset of lines of printing data comprising less than all of the lines of printing data is selected and a compression methodology is applied to the subset of lines of printing data to produce a partial compression ratio. The partial compression ratio is extrapolated to a full compression ratio based on a previously performed hardware compression. Then, an evaluation of whether to use the compression methodology on all of the lines of printing data can be performed based on the full compression ratio.

19 Claims, 2 Drawing Sheets

FLEXIBLE PRINT DATA COMPRESSION

BACKGROUND

Embodiments herein present methods for evaluating whether to compress data sent to a print device.

With some conventional systems, large digital images are sent from a print server to a remote printer via a network. These systems support the technical document marketplace. The physical size of such images can be quite large: 24"×36" is typical, and some prints can exceed 50 feet in length. Such remote printers may handle only one type of image (e.g., TIFF images) either compressed or uncompressed.

The print servers generally utilize hardware-type compression methodologies to allow the image data to be compressed/decompressed as it travels to and from the hard disk. However, this hardware-type compression is often incompatible with the image format. For example, in some systems, all TIFF compression for the remote printer is done via software-type compression methodologies, and not hardware-type compression methodologies. The software compression process may be very time consuming and may result in a poor compression ratio. If the compression ratio is to low (e.g., approaches 1:1), the compression process loses its utility and it may be more desirable to transmit an uncompressed image to the printer, rather than transmitting a poorly compressed image or utilizing a large amount of resources to compresses and decompress the image.

Previous criteria for determining whether to perform such a software compression depended on the user selection for document type, using the software compression statistics from the last few images as a predictor, or using the compression ratio obtained with the onboard hardware as a predictor.

SUMMARY

Embodiments herein present methods for evaluating whether to compress data sent to a print device. The methods receive bands of printing data. Each of the bands of printing data comprises a plurality of lines of printing data. A subset of lines of printing data comprising less than all of the lines of printing data is selected and a compression methodology is applied to the subset of lines of printing data to produce a partial compression ratio. The partial compression ratio is extrapolated to a full compression ratio. Then, an evaluation of whether to use the compression methodology on all of the lines of printing data can be performed based on the full compression ratio.

More specifically, a method according to embodiments herein comprises receiving bands of printing data, wherein each band of printing data comprises a plurality of lines of printing data. Then, a first compressing process is performed by applying a first compression methodology to all of the lines of printing data within each of the bands of printing data. This first compressing process produces a first full compression ratio and a compression ratio for each of the bands.

A subset of lines of printing data comprising less than all of the lines of printing data is selected. When selecting the subset of lines of printing data, the method selects a group of spatially diverse lines within the bands of printing data. A band compression ratio is obtained from the results of the first compression methodology for the band(s) in which the subset of lines occurs. A second compressing process is performed by applying a second compression methodology only to the subset of lines of printing data to produce a partial compression ratio. Calculations on the second compression are over a smaller subset of lines. The first compression methodology comprises a hardware compression methodology adapted to prepare the lines of data to be stored on a fixed medium and the second compression methodology comprises a printer compression methodology adapted to prepare data to be processed by a printer.

The partial compression ratio is extrapolated to a second full compression ratio based on a relationship between the first full compression ratio and the band compression ratio. The method then evaluates whether to use the second compression methodology on all of the lines of printing data based on the second full compression ratio. The evaluating process comprises determining whether the second full compression ratio is above a predetermined value.

These and other features are described in, or are apparent from, the following detailed description.

BRIEF DESCRIPTION OF THE DRAWINGS

Various exemplary embodiments of the systems and methods described in detail below, with reference to the attached drawing figures, in which.

DETAILED DESCRIPTION

Figure 1:
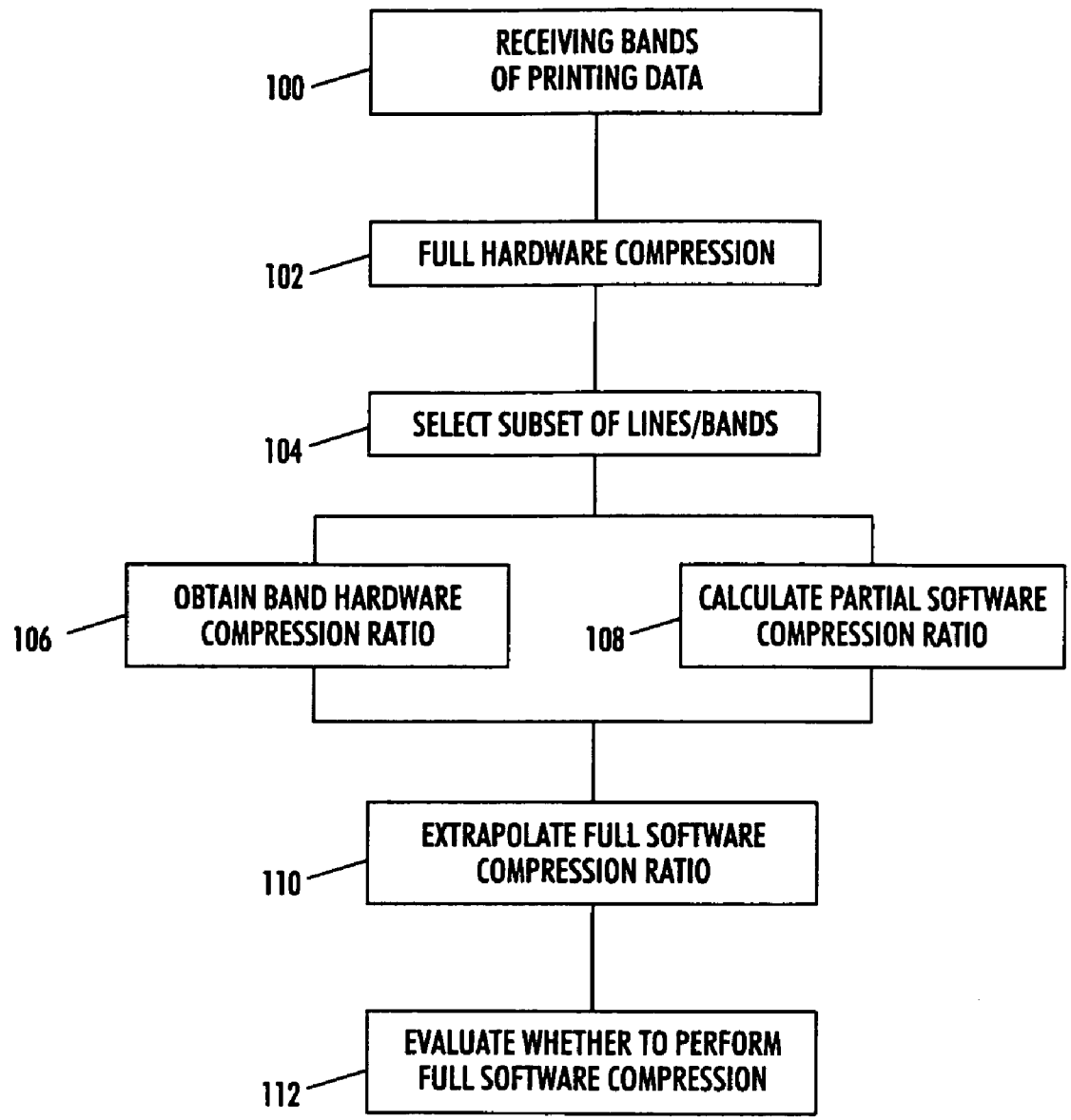
FIG. 1 is a flowchart illustrating a method embodiment.

Embodiments herein present methods for evaluating whether to compress data sent to a printing device. The methods receive bands of printing data. Each band of printing data comprises a plurality of lines of printing data. A subset of lines of printing data (comprising less than all of the lines of printing data) is selected and a compression methodology is applied to the subset of lines of printing data to produce a partial compression ratio. The partial compression ratio is extrapolated to a full compression ratio based on information from a previous hardware compression.

The hardware compression is always performed conventionally, therefore the compression ratio information from the hardware compression is essentially obtained for free. Using the hardware compression ratio information, the embodiments herein need only evaluate the compression ratio of a few lines of a band to extrapolate the full compression ratio of the software-type compression. Then, an evaluation of whether to use the software-type compression methodology on all of the lines of printing data can be performed based on the full software-type compression ratio that is found through the extrapolation process.

As image sections (bands) are compressed/decompressed using dedicated hardware, the print server maintains a hardware-type compression ratio for each band. The accumulation of all such bands makes up the full hardware compression ratio. This hardware-type compression ratio indicates the performance of the on-board chip compression utilized to store the print data on the fixed storage medium (e.g., hard drive). Prior to image transmission, the embodiments herein select a spatially diverse set of bands or lines of data that have been compressed/decompressed by the hardware. More specifically, to select a spatially diverse set of lines or bands, one or more lines of data that are not directly adjacent to one another (as they appear on the printed image) are selected. This can be accomplished by selecting some or all of the lines within bands that are not directly adjacent to one another (as they appear on the printed image). Therefore, for example, the lines that are selected can comprise the first few lines of all odd bands, the first few lines of every tenth band, the first few lines of every fiftieth band, etc. Alternatively, within a given band or bands, the odd lines, every tenth line, every fiftieth line, etc. can be selected. Further, this process can use a random number generator to determine which lines or bands are selected.

For each selected band or line, the embodiments herein perform a software-type compression (e.g., a TIFF-type compression). The embodiments herein then calculate an overall compression ratio for the software-type compression, without having to actually perform a software-type compression on all lines within all bands. Thus, the embodiments herein use a multiplier (based on a relationship of the full hardware compression ratio to one or more compression ratios of one or more of the individual bands that make up the full hardware compression ratio) to predict the full software-type compression ratio from the previously tracked hardware compression ratio.

As shown in the following equation, the embodiments herein select a spatially diverse subset of lines within one or more image bands, perform software-type compression on a small portion (the subset of lines) of one or more bands, and analyze all selected bands/lines to obtain a partial software-type compression ratio. In the following equation the partial software-type compression ratio is shown in the following equation as SWsel. The embodiments herein retrieve individual band data from the previously performed full hardware compression ratio for the band(s) containing the subset of lines to obtain a "band hardware compression ratio", which is shown in the following equation as HWsel. The previously stored full-page hardware compression ratio is referred to as HWfull. The equation solves for the full software-type compression, which is referred to as SWfull. One form of the equation is presented below:

$$SWfull = (HWfull * SWsel)/HWsel$$

Thus, SWfull is a prediction of the overall compression ratio that will be obtained if the software-type compression were to be used to compress the image. The number of bands/lines selected is variable. Selecting too many will increase the amount of time calculating SWsel. Including too few bands may reduce the effectiveness of the predictor, especially in spatially diverse (mixed mode) documents that include poor compression and good compression areas.

As shown in flowchart form in FIG. 1, a method according to embodiments herein comprises receiving bands of printing data 100. Each band of printing data comprises a plurality of lines of printing data. A first hardware-type compressing process 102 is performed by applying a first compression methodology to all of the lines of printing data within each of the bands of printing data. This hardware-type compression process 102 is performed to temporarily store data on a hardware device (e.g., storage medium, such as a hard drive, etc.). This first compressing process 102 produces a first full hardware-type compression ratio, which is an accumulation of all the individual compression ratios for each of the separate bands.

A subset of lines of printing data comprising less than all of the lines of printing data is selected in item 104. When selecting the subset of lines of printing data, the method selects a group of spatially diverse lines within the bands of printing data. Once the subset of lines/bands is selected, a band hardware-type compression ratio can be obtained by determining which band or bands contain the subset of lines of printing data in item 106.

More specifically, in item 106, only data compression information relating to the band or bands that contain at least one of the subset of lines is obtained/retrieved from the previous calculations. A second software-type compressing ratio can be determined by applying a second software-type compression methodology to the subset of lines of printing data to produce a partial compression ratio in item 108. As discussed above, the first compression methodology 102 comprises a hardware compression methodology adapted to prepare the lines of data to be stored on a fixed medium and the second compression methodology 108 comprises a printer compression methodology adapted to prepare data to be processed by a printer. Items 106 and 108 can be performed in any order or simultaneously after the subset of lines is selected in item 104.

In item 110, the partial compression ratio is extrapolated to a second full compression ratio based on a relationship between the first full compression ratio and the band compression ratio. One example of an equation which can perform this extrapolation is given above. The method then evaluates whether to use the second compression methodology on all of the lines of printing data based on the second full compression ratio in item 112.

The evaluating process 112 comprises determining whether the second full compression ratio is above a predetermined value. For example, if the compression ratio approaches 1:1 there is essentially very little being compressed and the time and resources being expended to perform the compression make the compression not worthwhile. Thus, as the compression process loses its utility, it may be more desirable to transmit an uncompressed image to the printer, rather than transmitting a poorly compressed image or utilizing a large amount of resources to compresses and decompress the image. The user/designer can establish any ratio cutoff for when the software-type compression should not be performed. For example, the user/designer could choose 5:1, 3:1, 2:1, or any other predetermined cutoff compression ratio or valve for establishing when to perform the software compression and when not to do so.

Figure 2:
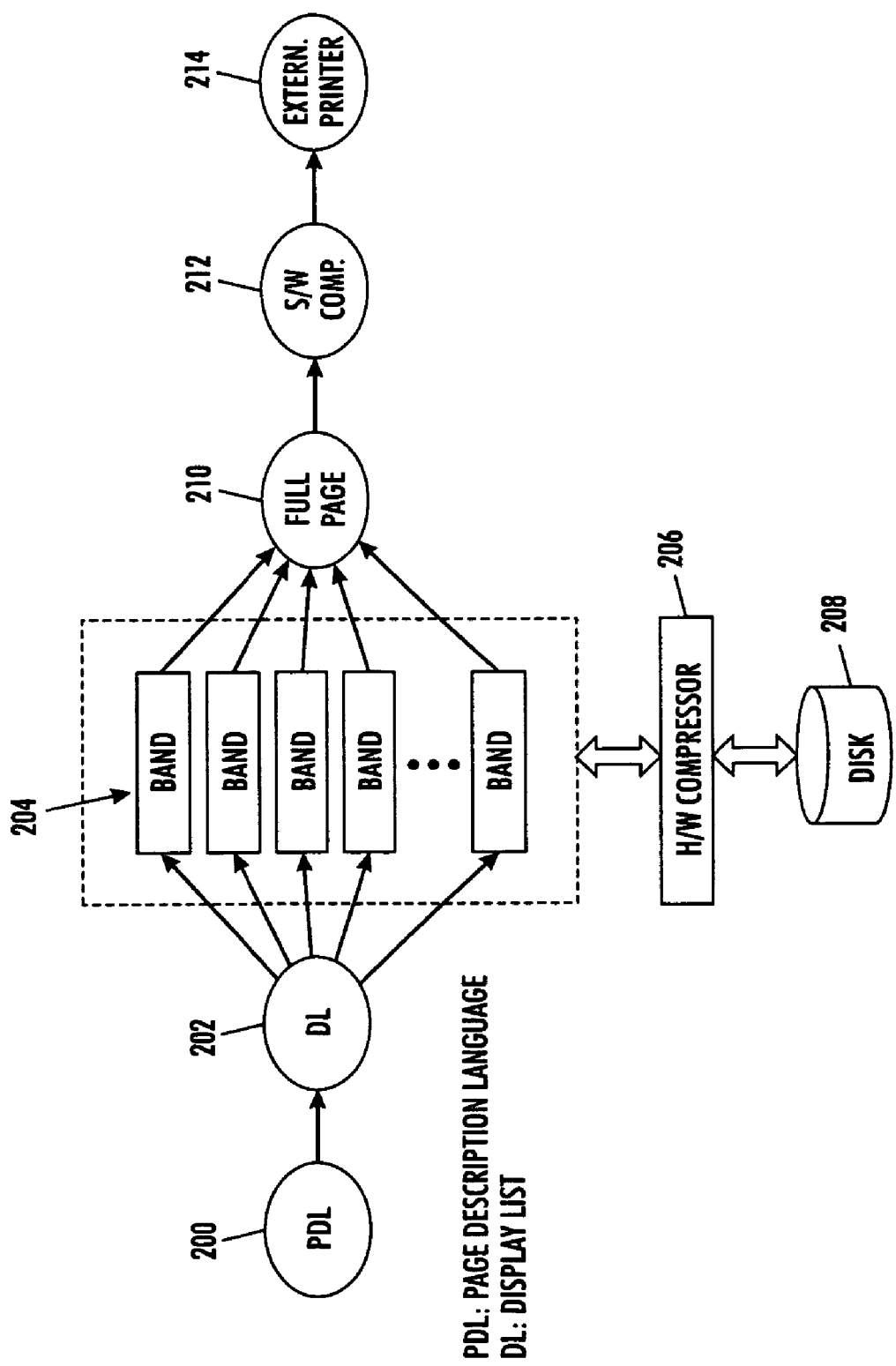
FIG. 2 is a schematic representation of a system embodiment.

The embodiments herein are applicable with a multitude of systems including those with on board hardware compression, those with an outgoing image compression type that is not supported by hardware compression, and where the addition of hardware is not feasible due to cost. For example, FIG. 2 illustrates a system that includes a page description language (PDL) processor 200 that produces a display list 202 of the bands 204 that will be printed to form an image. A print controller (hardware (H/W) compressor) 206 compresses and decompresses the image bands 204 as they are stored to and read from the storage medium (e.g., hard disk 208).

Bands 204 are continually retrieved from memory or disk 208 and decompressed as they are made ready for rendering graphic elements into the band. For example, the print controller 206 may accept many PDLs (Page Description Languages) such as PostScript, HPGL, and CGM. The PDL is broken down into the display list 202 elements, which are PDL-independent internal graphical rendering commands. As new display list 202 elements are processed, many image bands 204 may be recalled for rendering. During rendering, image bands are continually compressed/decompressed to and from the disk 208.

The embodiments herein get the hardware compression ratios essentially "for free" because, as mentioned above, the hardware-type compression is always performed as the bands are compressed/decompressed to and from the hard disk 208. Only a minimal amount of code is added to store this information as part of the band structure 204.

Once rendering is complete, all bands are decompressed and assembled to form a complete image or full page 210.

This uncompressed image 210 is submitted to a writer module 212 that will either write the image uncompressed to the external printer 214 or use software-type compression to compress the image, after which the external printer 214 decompresses this software-type compression. When the writer module 212 is processing the data is the point at which the decision 112 is made as to whether or not the software-type compression should be performed.

By utilizing the partial software compression 108 and extrapolation process 110 to calculate whether the software-type compression should be performed on all bands, the embodiments herein have increased throughput from the writer module 212 to the remote printers 214 by 50% in some devices. Prior to the embodiments herein, photographic images that had high hardware-type compression ratios, were assumed to be good candidates for software compression. However, in many cases, high hardware-type compression did not translate to high software-type compression. Indeed, some software-type compression of large images could take up to a minute per image, and result in compressed image sizes almost as large as the original. The embodiments herein overcome this problem by actually performing limited software-type compression to determine the compression ratio that can be expected during software-type compression. Further, the embodiments herein only sample a few of the lines of printing data within each band or between bands to perform this evaluation in a streamlined process that does not consume a significant amount of resources.

It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A machine-implemented method comprising:
   receiving, using a controller, bands of printing data, wherein each band of printing data comprises a plurality of lines of printing data;
   randomly selecting, using said controller, a subset of bands and randomly selecting a subset of lines of printing data comprising less than all of said lines of printing data;
   applying, using said controller, a compression methodology to said subset of lines of printing data to produce a partial compression ratio;
   extrapolating, using said controller, said partial compression ratio to a full compression ratio; and
   evaluating, using said controller, whether to use said compression methodology on all of said lines of printing data based on said full compression ratio, wherein said randomly selecting of said subset of bands and said subset of lines of printing data comprises randomly selecting a group of spatially diverse lines within said bands of printing data.

2. The method according to claim 1, wherein said evaluating process comprises determining whether said full compression ratio is above a predetermined value.

3. The method according to claim 1, further comprising, prior to selecting said subset of lines of printing data, performing a hardware compression methodology adapted to prepare said lines of printing data to be stored on a fixed medium.

4. The method according to claim 1, wherein said compression methodology comprises a printer compression methodology adapted to prepare data to be processed by a printer.

5. A machine-implemented method comprising:
   receiving, using a controller, bands of printing data, wherein each band of printing data comprises a plurality of lines of printing data;
   performing a first compressing process comprising applying a first compression methodology to all of said bands of printing data, wherein said first compressing process produces a first full compression ratio;
   selecting, using said controller, a subset of lines of printing data comprising less than all of said lines of printing data;
   performing a second compressing process comprising applying a second compression methodology to said subset of lines of printing data to produce a partial compression ratio;
   extrapolating, using said controller, said partial compression ratio to a second full compression ratio based on said first full compression ratio; and
   evaluating, using said controller, whether to use said second compression methodology on all of said lines of printing data based on said second full compression ratio.

6. The method according to claim 5, wherein said selecting of said subset of lines of printing data comprises selecting a group of spatially diverse lines within said bands of printing data.

7. The method according to claim 5, wherein said evaluating process comprises determining whether said second full compression ratio is above a predetermined value.

8. The method according to claim 5, wherein said first compression methodology comprises a hardware compression methodology adapted to prepare said lines of data to be stored on a fixed medium.

9. The method according to claim 5, wherein said second compression methodology comprises a printer compression methodology adapted to prepare data to be processed by a printer.

10. A machine-implemented method comprising:
    receiving, using a controller, bands of printing data, wherein each band of printing data comprises a plurality of lines of printing data;
    performing a first compressing process comprising applying a first compression methodology to all of said bands of printing data, wherein said first compressing process produces a first full compression ratio;
    selecting, using said controller, a subset of lines of printing data comprising less than all of said lines of printing data;
    obtaining, using said controller, a band compression ratio from said first compression process for a band containing said subset of lines of printing data;
    performing a second compressing process comprising applying a second compression methodology to said subset of lines of printing data to produce a partial compression ratio;
    extrapolating, using said controller, said partial compression ratio to a second full compression ratio based on a relationship between said first full compression ratio and said band compression ratio; and
    evaluating, using said controller, whether to use said second compression methodology on all of said lines of printing data based on said second full compression ratio.

11. The method according to claim 10, wherein said selecting of said subset of lines of printing data comprises selecting a group of spatially diverse lines within said bands of printing data.

12. The method according to claim 10, wherein said evaluating process comprises determining whether said second full compression ratio is above a predetermined value.

13. The method according to claim 10, wherein said first compression methodology comprises a hardware compression methodology adapted to prepare said lines of data to be stored on a fixed medium.

14. The method according to claim 10, wherein said second compression methodology comprises a printer compression methodology adapted to prepare data to be processed by a printer.

15. A machine-implemented method comprising:

receiving, using said controller, bands of printing data, wherein each band of printing data comprises a plurality of lines of printing data;

performing a first compressing process comprising applying a hardware compression methodology to all of said bands of printing data, wherein said first compressing process produces a first full compression ratio;

selecting, using said controller, a subset of lines of printing data comprising less than all of said lines of printing data;

obtaining, using said controller, a band compression ratio from said first compression process for a band containing said subset of lines of printing data;

performing a second compressing process comprising applying a software compression methodology to said subset of lines of printing data to produce a partial compression ratio;

extrapolating, using said controller, said partial compression ratio to a second full compression ratio based on a relationship between said first full compression ratio and said band compression ratio; and evaluating, using said controller, whether to use said software compression methodology on all of said lines of printing data based on said second full compression ratio.

16. The method according to claim 15, wherein said selecting of said subset of lines of printing data comprises selecting a group of spatially diverse lines within said bands of printing data.

17. The method according to claim 15, wherein said evaluating process comprises determining whether said second full compression ratio is above a predetermined value.

18. The method according to claim 15, wherein said hardware compression methodology is adapted to prepare said lines of data to be stored on a fixed medium.

19. The method according to claim 15, wherein said software compression methodology is adapted to prepare data to be processed by a printer.

* * * * *